Feb. 10, 1925.

E. B. CAMPBELL

TRACTOR WHEEL

Filed Jan. 24, 1924

1,525,439

Inventor:
Edward B. Campbell,
By Rippey & Kingsland
His Attorneys.

Patented Feb. 10, 1925.

1,525,439

UNITED STATES PATENT OFFICE.

EDWARD B. CAMPBELL, OF ST. LOUIS, MISSOURI.

TRACTOR WHEEL.

Application filed January 24, 1924. Serial No. 688,336.

*To all whom it may concern:*

Be it known that I, EDWARD B. CAMPBELL, a citizen of the United States, residing at St. Louis, Missouri, have invented new and useful Improvements in Tractor Wheels, of which the following is a specification.

This invention relates to tractor wheels, and consists in the novel construction hereinafter disclosed.

An object of the invention is to provide a wheel for tractors and the like composed of a central disc having a staggered series of curved plates arranged adjacent to the periphery of the disc in such manner as to provide a traction surface that will operate over all ground surfaces, according the maximum amount of traction.

Additional advantages of the construction will be understood from the following detailed description thereof, taken in connection with the accompanying drawing in which—

Figure 1:
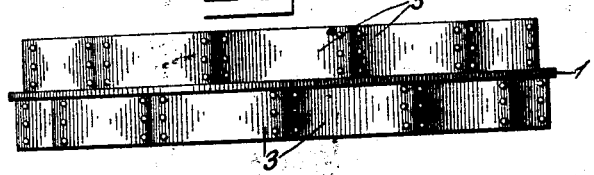
Fig. 1 is a plan view.
Figure 2:
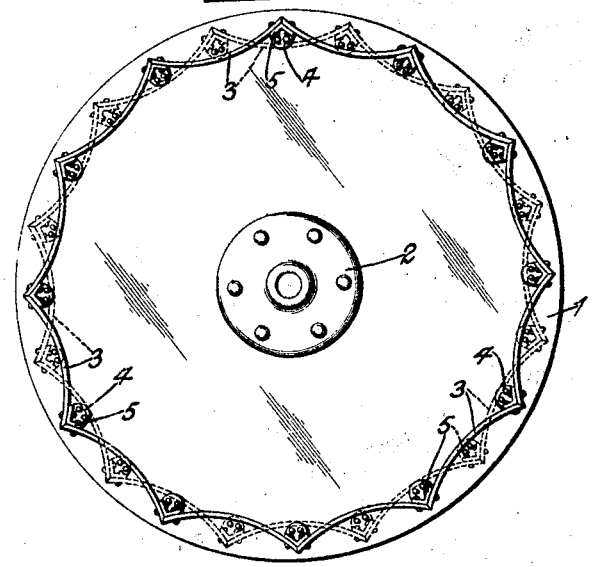
Fig. 2 is a side elevation.
Figure 3:
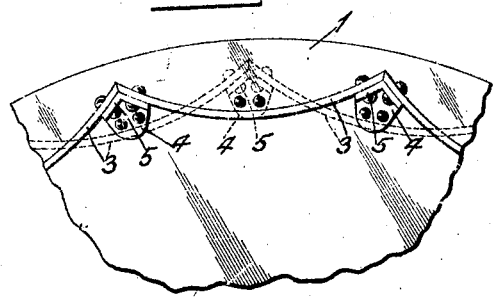
Fig. 3 is a detailed plan view, enlarged, showing the manner in which the curved plates are attached to the disc.
Figure 4:
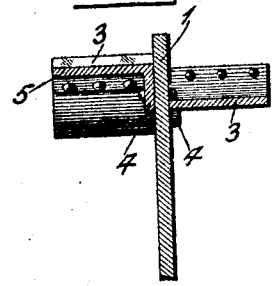
Fig. 4 is a fragmentary cross section further illustrating the construction.

In the embodiment of the invention illustrated in the drawing the improved wheel is shown as comprising a central circular disc 1 having a hub member 2, said disc preferably being made of sheet steel. On each side of the disc and located adjacent to the periphery thereof is a series of curved plates 3, said plates being arranged in staggered relationship and curving inwardly to form concave pockets and points for traction contact with the ground surface. These plates 3 are preferably of pressed steel and are attached in a continuous series to the respective faces of the disc 1 by brackets comprising a base plate 4 and outwardly extending angularly disposed flanges 5. The brackets are attached to the respective faces of the disc 1 by riveting the base plates 4 in an annular series near the outer edge of the disc. The plates 3 extend laterally from the disc, the ends of the plates resting on the flanges 5 to which they are directly riveted.

It will be noted that the outer line of the point formed by the matching edges of the plates 3 is slightly within the periphery of the disc 1 so that the periphery of the disc 1 constitutes the outer circumference of the wheel. In operating upon hard ground the periphery of the disc provides an annular plane surface for supporting the weight of the vehicle to which the wheel is attached. When operating on soft ground the points formed by the matching edges of the curved plates constitute the tractor teeth which, it will be noted, are staggered on opposite sides of the disc. The concave pockets, formed by the curved surface of the plates between the joined edges, are so formed that the same will not clog up with soft dirt, but will leave the full surface of the plates free to act to prevent the vehicle sinking into even very soft ground.

As the edge of the disc extends beyond the points formed by the matching curved plates in soft ground, lateral movement of the vehicle is prevented to any appreciable extent. The construction permits the wheel to be made of relatively light metal inasmuch as the joined curved plates, in addition to acting as a traction surface for the wheel, provide a continuous annular strut member reinforcing the periphery of the wheel.

I am aware that the invention may be modified within equivalent limits. What I claim and desire to secure by Letters Patent is:—

1. A tractor wheel comprising an annular disc provided with a hub member, annular series of inwardly curved plates arranged at each side of the disc and adjacent to the periphery thereof, and brackets for securing said plates to said disc.

2. A tractor wheel comprising an annular disc provided with a hub member, annular series of inwardly curved plates arranged at each side of the disc and adjacent to the periphery thereof, said plates being arranged in staggered relationship on opposite sides of the disc, and brackets for securing said plate to said disc.

3. A tractor wheel comprising an annular disc of sheet metal; a series of brackets comprising a base plate and outwardly extending angularly arranged flanges riveted to the disc on each side and adjacent to the periphery thereof; and a series of inwardly curved laterally extending plates secured to said angularly arranged flanges.

4. A tractor wheel comprising an annular disc of sheet metal; a series of brackets comprising a base plate and outwardly extending angularly arranged flanges riveted to the disc on each side and adjacent to the periphery thereof, said brackets being arranged at equally spaced distances and in staggered relationship on opposite sides of the disc; and a series of inwardly curved laterally extending plates secured to said angularly arranged flanges.

5. A tractor wheel comprising a circular central member, inwardly curved laterally extending metallic walls attached to said disc on each side thereof within the periphery thereof, and brackets for supporting the adjacent edges of said walls.

6. A tractor wheel comprising a circular central member, inwardly curved laterally extending metallic walls attached to said disc on each side and within the periphery thereof, and brackets for supporting the adjacent edges of said walls, said brackets being arranged at equally spaced intervals and in staggered relationship on opposite sides of the disc.

EDWARD B. CAMPELL.